United States Patent
Kim et al.

(10) Patent No.: US 10,020,552 B2
(45) Date of Patent: Jul. 10, 2018

(54) METAL AIR BATTERY AND CATHODE CURRENT COLLECTOR INCLUDED THEREIN

(71) Applicant: Samsung Electronics Co., Ltd., Suwon-si, Gyeonggi-do (KR)

(72) Inventors: Joonhee Kim, Seoul (KR); Kyounghwan Choi, Suwon-si (KR); Jungock Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 254 days.

(21) Appl. No.: 15/149,317

(22) Filed: May 9, 2016

(65) Prior Publication Data
US 2017/0033422 A1 Feb. 2, 2017

(30) Foreign Application Priority Data
Jul. 27, 2015 (KR) .................. 10-2015-0106107

(51) Int. Cl.
| | | |
|---|---|---|
| *H01M 12/06* | (2006.01) | |
| *H01M 4/88* | (2006.01) | |
| *H01M 4/04* | (2006.01) | |
| *H01M 4/86* | (2006.01) | |
| *H01M 4/02* | (2006.01) | |

(52) U.S. Cl.
CPC ....... *H01M 12/065* (2013.01); *H01M 4/0407* (2013.01); *H01M 4/8657* (2013.01); *H01M 4/8807* (2013.01); *H01M 2004/027* (2013.01); *H01M 2004/8689* (2013.01)

(58) Field of Classification Search
CPC ......... H01M 12/065; H01M 2004/027; H01M 2004/8689; H01M 4/0407; H01M 4/8657; H01M 4/8807
See application file for complete search history.

(56) References Cited

U.S. PATENT DOCUMENTS

| | | | |
|---|---|---|---|
| 5,069,988 A | * | 12/1991 | Tomantschger ........ H01M 4/86 429/206 |
| 7,807,310 B2 | | 10/2010 | Eun et al. |
| 2014/0178776 A1 | | 6/2014 | Mistuoka et al. |
| 2015/0140452 A1 | | 5/2015 | Park et al. |

FOREIGN PATENT DOCUMENTS

| | | |
|---|---|---|
| JP | 2011-210398 A | 10/2011 |
| JP | 2014-123459 A | 7/2014 |
| KR | 1020080099021 A | 11/2008 |

* cited by examiner

*Primary Examiner* — Carlos Barcena
(74) *Attorney, Agent, or Firm* — Cantor Colburn LLP (57) ABSTRACT

A metal air battery includes: at least one gas diffusion layer including a first surface and a second surface facing the first surface; at least one cathode layer disposed on the first surface and on the second surface of the gas diffusion layer and configured to use oxygen as an active material; an electrolyte membrane disposed on the cathode layer; an metal anode layer disposed on the electrolyte membrane; and a cathode current collector including at least one blade, wherein the gas diffusion layer is electrically conductive, and wherein the at least one blade of the cathode current collector contacts and is at least partially embedded in the gas diffusion layer.

18 Claims, 10 Drawing Sheets

METAL AIR BATTERY AND CATHODE CURRENT COLLECTOR INCLUDED THEREIN

CROSS-REFERENCE TO RELATED APPLICATION

This application claims priority to and the benefit of Korean Patent Application No. 10-2015-0106107, filed on Jul. 27, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a metal air battery and a cathode current collector included therein.

2. Description of the Related Art

A lithium air battery includes an anode capable of intercalating and deintercalating lithium ions, a cathode capable of oxidizing/reducing oxygen in the air, and an electrolyte disposed between the cathode and the anode.

The lithium air battery may have a high capacity since lithium itself is used as an anode and there is no need to store a cathode active material in the battery air because oxygen in the air is the cathode active material. The lithium air battery has a theoretical energy density per unit weight of 3500 Watt-hours per kilogram (Wh/kg) or greater, which is about 10 times that of a lithium ion battery.

Nonetheless, there is still a need for an improved lithium air battery to provide improved specific capacity and high energy density.

SUMMARY

Provided is a metal air battery having improved current collection and providing an improved combination of specific capacity and energy density.

Provided is a cathode current collector for a metal air battery, the cathode current collector being capable of minimizing contact inhibition between a gas diffusion layer and air, while simultaneously improving an area of the cathode current collector which is in contact with the gas diffusion layer.

Additional aspects will be set forth in part in the description which follows and, in part, will be apparent from the description, or may be learned by practice of the presented exemplary embodiments.

According to an aspect, a metal air battery includes: at least one gas diffusion layer including a first surface and a second surface facing the first surface; at least one cathode layer disposed on the first surface and on the second surface of the gas diffusion layer and configured to use oxygen as an active material; an electrolyte membrane disposed on the cathode layer; a metal anode layer disposed on the electrolyte membrane; and a cathode current collector including at least one blade, wherein the gas diffusion layer is electrically conductive, and wherein the at least one blade of the cathode current collector contacts and is at least partially embedded in the gas diffusion layer.

The cathode current collector may have a network structure including a plurality of rod-shaped supports and a plurality of blades which intersect the plurality of the rod-shaped supports.

The cathode current collector may be arranged such that the at least one blade may be at least partially embedded in the gas diffusion layer (GDL) in a direction transverse to a longitudinal direction of the GDL.

The cathode current collector may include two or more blades spaced apart from each other at intervals greater than 0 millimeters (mm) and less than about 20 mm.

A width of the GDL may be equal to a width of the metal anode layer.

The cathode current collector may include a plate-shaped support, and the at least one blade may be disposed on a surface of the plate-shaped support, and the at least one blade may be at least partially embedded in the GDL in a direction parallel to a longitudinal direction of the GDL.

The cathode current collector may be arranged such that the at least one blade may be at least partially embedded in the body of the GDL.

When the metal air battery includes at least two adjacent GDLs and at least two blades, the at least two blades may be disposed side by side on a surface of the support and may be spaced apart from each other, and at least one of the two or more blades may be embedded in a gap between the at least two adjacent GDLs.

The at least two or more blades may be spaced apart from each other at an interval of greater 0 mm to less than 50 mm.

A width of the plate-shaped support may be about 2% or less than a length of the GDL, a length of the blade may be 50% or less than the width of the GDL and a greatest thickness of the blade may be 75% or less than a thickness of the GDL.

A thickness of the at least one blade may gradually decreases from an outer surface of the GDL toward an inside of the metal air battery.

A ratio of a smallest thickness to a greatest thickness of the at least one blade may be in a range of about 0.1:1 to about 0.5:1.

The at least one blade may include at least one of stainless steel, copper, stainless steel plated with gold to a thickness of 10 µm or less, or copper plated with gold to a thickness of 10 µm or less.

According to an aspect, a cathode current collector for a metal air battery includes a network structure including a plurality of rod-shaped supports and a plurality of blades which intersect the plurality of rod-shaped supports.

According to yet another aspect, a method of preparing a metal air battery includes: disposing at least one cathode layer on a first surface and on a second surface of at least one gas diffusion layer; disposing an electrolyte membrane on the cathode layer; disposing a metal anode layer on the electrolyte membrane; providing a cathode current collector including at least one blade; and at least partially embedding the at least one blade in the gas diffusion layer to prepare the metal air battery, wherein the cathode current collector contacts the gas diffusion layer.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments in connection with a metal air battery, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

Exemplary embodiments are described herein with reference to cross section illustrations that are schematic illustrations of idealized embodiments. Sizes of components in the drawings may be exaggerated for convenience of explanation. Thus sizes and thicknesses of components in the drawings may be arbitrarily illustrated for convenience of explanation; the following embodiments are not limited thereto. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. In the case where a positional relationship between two items is described with the terms "on," "on the top of," or the like, one or more items may be interposed therebetween unless the term "directly" is used in the expression.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A current collector used in a lithium air battery can be in direct contact with the atmosphere and in the form of a net. The current collector is used by placing it in contact with an electrode. This type of current collector is placed in contact with a major surface of an electrode. This type of current collector thus has difficulties in application when only a small area of a gas diffusion layer is placed in contact with the current collector. A metal air battery includes a cathode designed to maximize a capacity of the metal air battery compared to a volume thereof, and an area of the cathode in contact with the air can be identical to an area of a side portion of a gas diffusion layer which has a thickness of only hundreds of micrometers. Thus, the cathode current collector which is only in contact with side surfaces of the gas diffusion layer has insufficient current collecting properties.

Figure 1A:
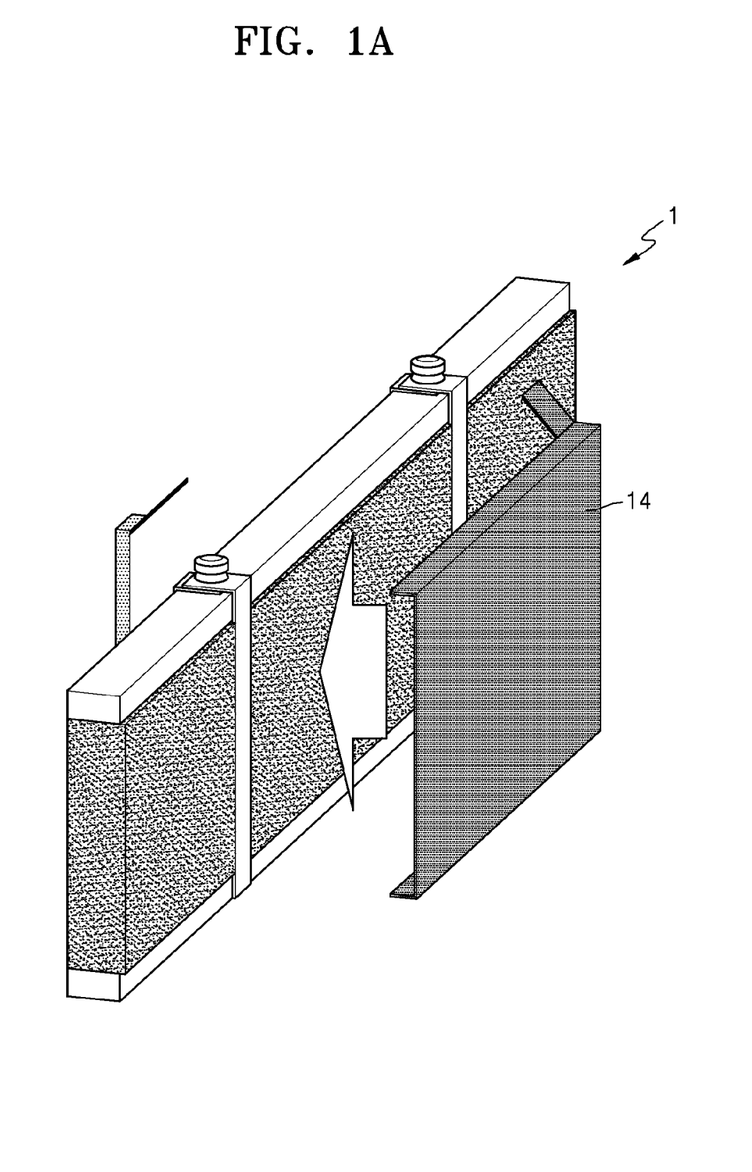
FIG. 1A is a schematic perspective view illustrating a metal air battery prior to being equipped with a cathode current collector, according to an exemplary embodiment.
Figure 1B:
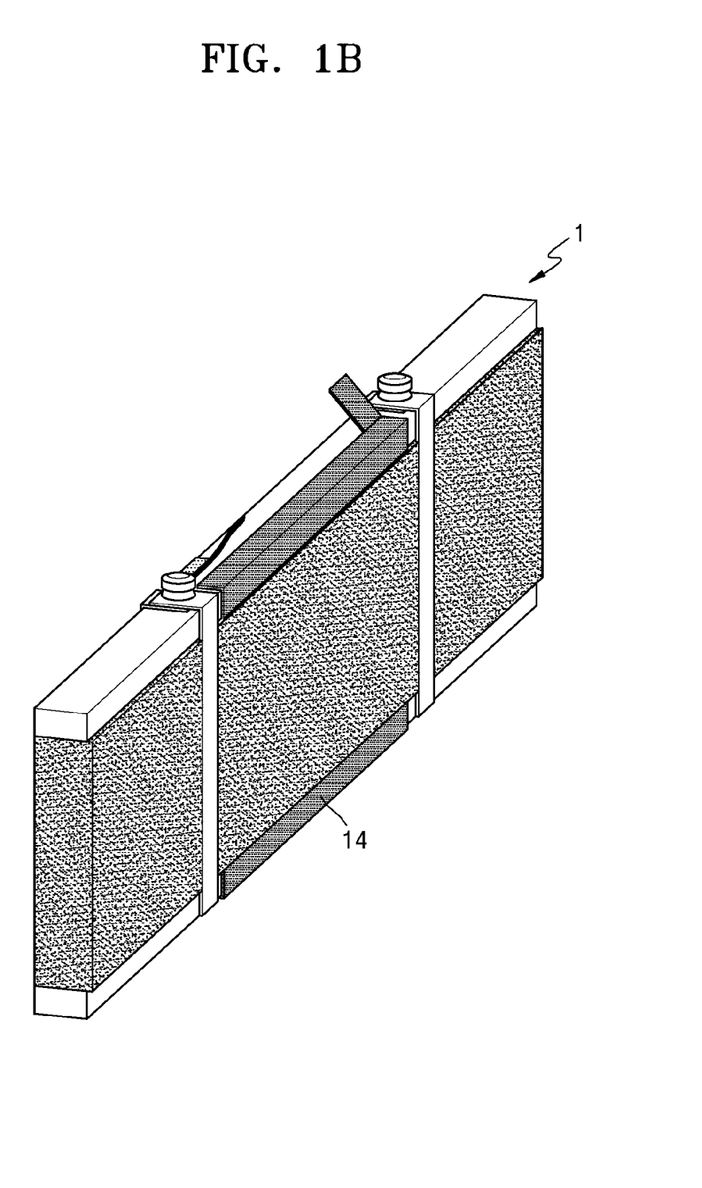
FIG. 1B is a schematic perspective view illustrating a metal air battery including a cathode current collector, according to an exemplary embodiment.
Figure 1C:
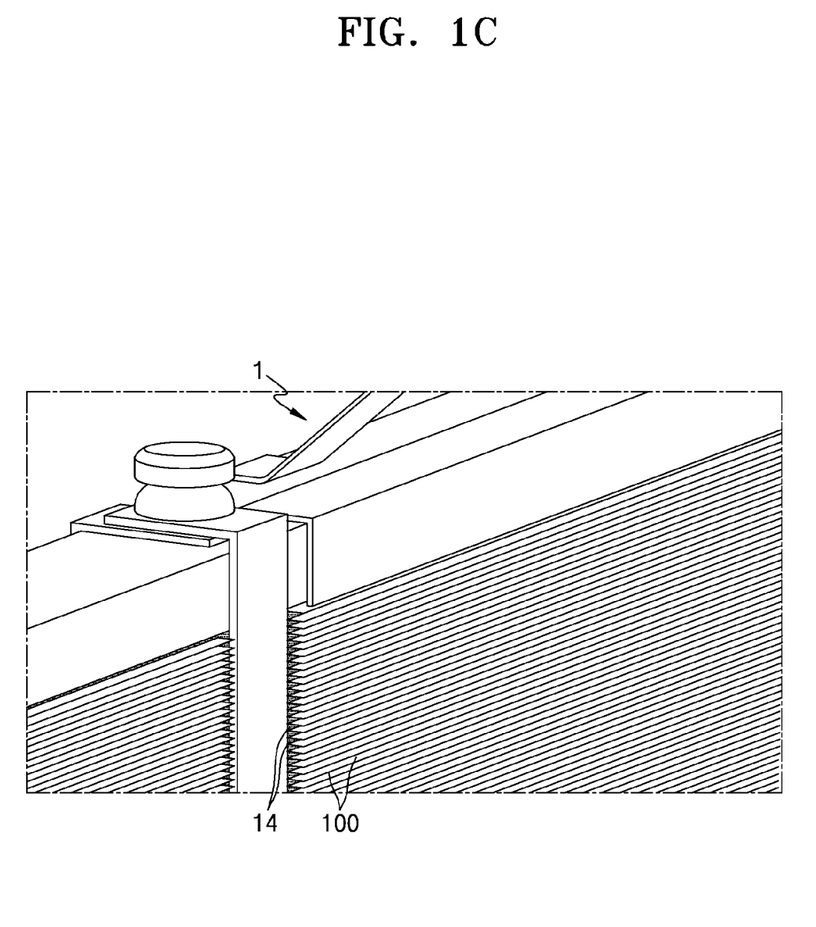
FIG. 1C is an enlarged view of a portion of FIG. 1B.
Figure 1D:
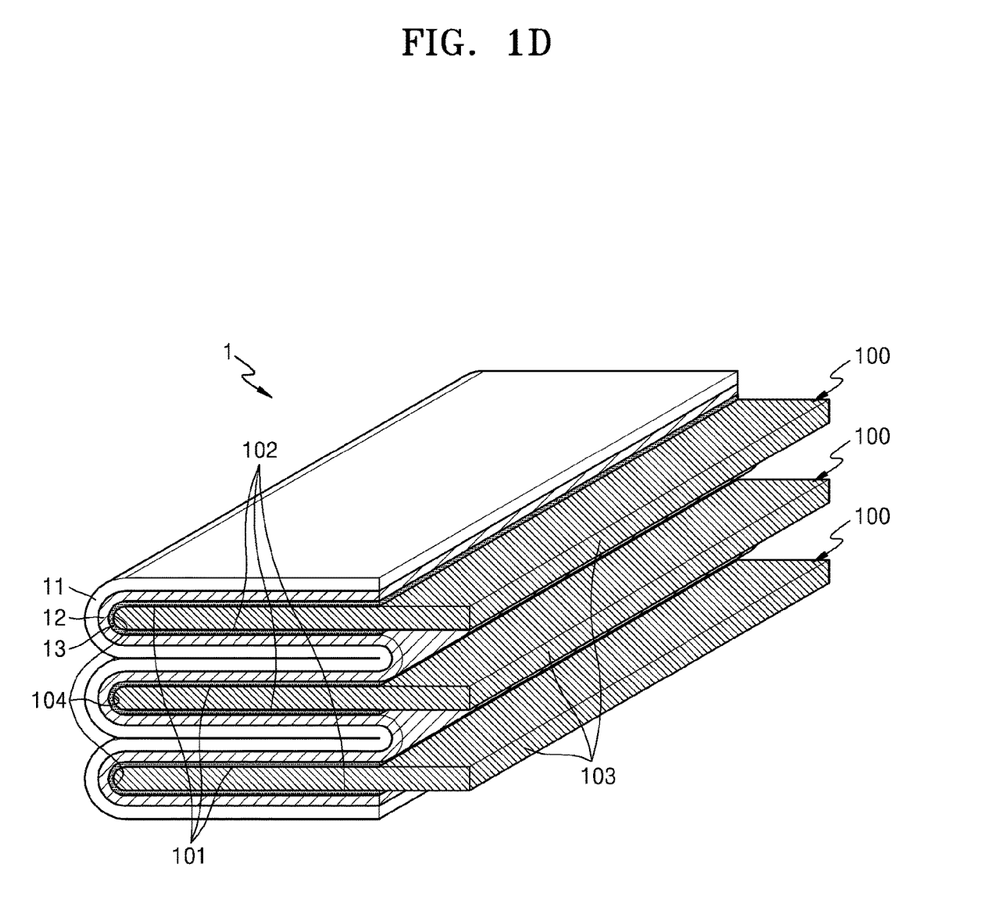
FIG. 1D is a schematic perspective view illustrating the metal air battery of FIG. 1B without illustrating the cathode current collector.

FIG. 1A is a schematic perspective view illustrating a metal air battery 1 prior to being equipped with a cathode current collector, according to an exemplary embodiment. FIG. 1B is a schematic perspective view illustrating the metal air battery 1 including the cathode current collector 14, according to an exemplary embodiment. FIG. 1C is a perspective view illustrating an enlarged portion of FIG. 1B and showing the metal air battery 1 of FIG. 1B. FIG. 1D is a schematic perspective view illustrating the metal air battery 1 of FIG. 1B without illustrating the cathode current collector 14.

Referring to FIGS. 1A to 1D, the metal air battery 1 according to an exemplary embodiment includes a gas diffusion layer (GDL) 100, a cathode layer 13, an electrolyte membrane 12, a metal anode layer 11, and the cathode current collector 14.

The GDL 100 is configured to absorb oxygen present in the air and to provide it to the cathode layer 13. In this regard, to facilitate diffusion of external oxygen, the GDL 100 may have a porous structure. For example, the GDL 100 may have a plurality of holes, each of which has a diameter of 10 micrometers (µm) or less.

Referring to FIG. 1D, the GDL 100 includes a first surface 101, a second surface 102 facing the first surface 101, and a plurality of side surfaces connecting the first surface 101 and the second surface 102.

A side surface 103 of the GDL 100 may be exposed to the outside of the metal air battery 1. For example, the cathode layer 13 may be partially disposed on the GDL 100, and the metal anode layer 11, the electrolyte membrane 12, and the cathode layer 13 may be configured in a position to partially surround the GDL 100 so that the cathode layer 13 contacts each of the first and second surfaces 101 and 102, respectively, of the GDL 100. Here, the side surface 103 of the GDL 100 may be exposed to the outside of the metal air battery 1.

As such, when the metal air battery 1 has a structure in which the cathode layer 13 is disposed on the first and second surfaces 101 and 102 of the GDL 100, the first and second surfaces 101 and 102 of the GDL 100 are not exposed to the outside of the metal air battery 1. Accordingly, the air supplied to the GDL 100 is provided through the plurality of the side surfaces of the GDL 100 or through a portion of the plurality of the side surfaces of the GDL 100. For example, the supply of air to the GDL 100 may be provided through the side surface 103 among the plurality of the side surfaces.

The metal air battery 1 may have a structure designed to facilitate the supply of air through the plurality of the side surfaces that are exposed to the outside of the GDL 100.

In addition, although not illustrated in the figures, an exterior material (not shown) may surround the metal anode layer 11, the electrolyte membrane 12, the cathode layer 13, and other outer surfaces of the GDL 100, and may not surround the exposed side surface 103 of the GDL 100.

In addition, referring to FIG. 1D, a width of the GDL 100 may be greater than a width W of the metal anode layer 11.

The GDL 100 may be electrically conductive. For example, the GDL 100 may comprise at least one of carbon paper, carbon fiber, carbon cloth, carbon felt, a sponge-like metal foam, and a metal fiber mat.

The cathode layer 13 may be disposed on each of the first and second surfaces 101 and 102 of the GDL 100.

In an exemplary embodiment, the cathode layer 13, as one layer, may include a bend in order to surround at least 3 surfaces of the GDL 100. In another exemplary embodiment, the cathode layer 13 may include a bend in order to face the first surface 101, the second surface 102, and a side surface 104 of the GDL 100. The metal anode layer 11 and the electrolyte membrane 12 may also include a bend in the same or similar manner as in the cathode layer 13.

The cathode layer 13 may include an electrolyte for the conduction of metal ions, a catalyst for oxidation and reduction of oxygen, a conductive material, and a binder. For example, the electrolyte, the catalyst, the conductive material, and the binder may be mixed together, and then a solvent may be added thereto to prepare a cathode slurry. The cathode slurry may be applied onto the electrolyte membrane 12 and dried, thereby forming the cathode layer 13.

The electrolyte may include a lithium salt. Examples of the lithium salt include at least one of $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, and lithium bis(trifluoromethanesulfonyl)imide (LiTFSI). The electrolyte may optionally further include a metal salt other than the lithium salt. For example, the electrolyte may optionally further include at least one metal salt of $AlCl_3$, $MgCl_2$, NaCl, KCl, NaBr, KBr, and $CaCl_2$.

The conductive material may comprise, for example, at least one of a porous carbonaceous material, a conductive metallic material, and a conductive organic material. Examples of the carbonaceous material include at least one of carbon black, graphite, graphene, activated carbon, carbon fiber, and carbon nanotube. The conductive metallic material may be, for example, in the form of metal powder.

The catalyst may include, for example, at least one of platinum (Pt), gold (Au), and silver (Ag). Alternatively, the catalyst may include, for example, an oxide of at least one of manganese (Mn), nickel (Ni), and cobalt (Co).

In addition, the binder may include, for example, at least one of polytetrafluoroethylene (PTFE), polypropylene, polyvinylidene difluoride (PVDF), polyethylene, and styrene-butadiene rubber.

The electrolyte membrane 12 serves to transfer metal ions to the cathode layer 13. In this regard, the electrolyte membrane 12 may include an electrolyte formed by dissolving metal salts in a solvent. The electrolyte may be a solid electrolyte including at least one of a polymer-based electrolyte, an inorganic electrolyte, and a composite electrolyte, and may be formed by mixing the foregoing materials. In addition, the electrolyte may be prepared as a bendable electrolyte.

The metal salt may comprise the lithium salt such as those disclosed above, and may optionally further include a metal salt other than the lithium salt. For example, the metal salt may optionally further include at least one metal salt of $AlCl_3$, $MgCl_2$, NaCl, KCl, NaBr, KBr, and $CaCl_2$.

Any suitable material capable of dissolving the lithium salt and the metal salt may be used as the solvent.

In addition, the electrolyte membrane 12 may further include a separator that prevents permeation of oxygen and which has suitable metal ion conductivity. Any suitable polymer-based and bendable separator may be used as the separator. For example, the separator may include a non-woven polymer fabric, such as a non-woven fabric of polypropylene material or a non-woven fabric of polyphenylene sulfide, or a porous film comprising an olefin-based resin, such as polyethylene or polypropylene. The separator and the electrolyte may be formed as separate layers, alternatively, the electrolyte membrane 12 may be formed as a single layer integrated with a porous separator by impregnating the electrolyte into pores of the porous separator. For example, an electrolyte formed by mixing polyethylene oxide (PEO) and LiTFSI may be impregnated into pores of the porous separator so as to prepare the electrolyte membrane 12.

The metal anode layer 11 serves to intercalate and deintercalate metal ions, and may be disposed on the electrolyte membrane 12.

Examples of materials which may be used for the metal anode layer 11 include at least one of lithium (Li), sodium (Na), zinc (Zn), potassium (K), calcium (Ca), magnesium (Mg), iron (Fe), and aluminum (Al), and an alloy thereof.

Figure 2A:
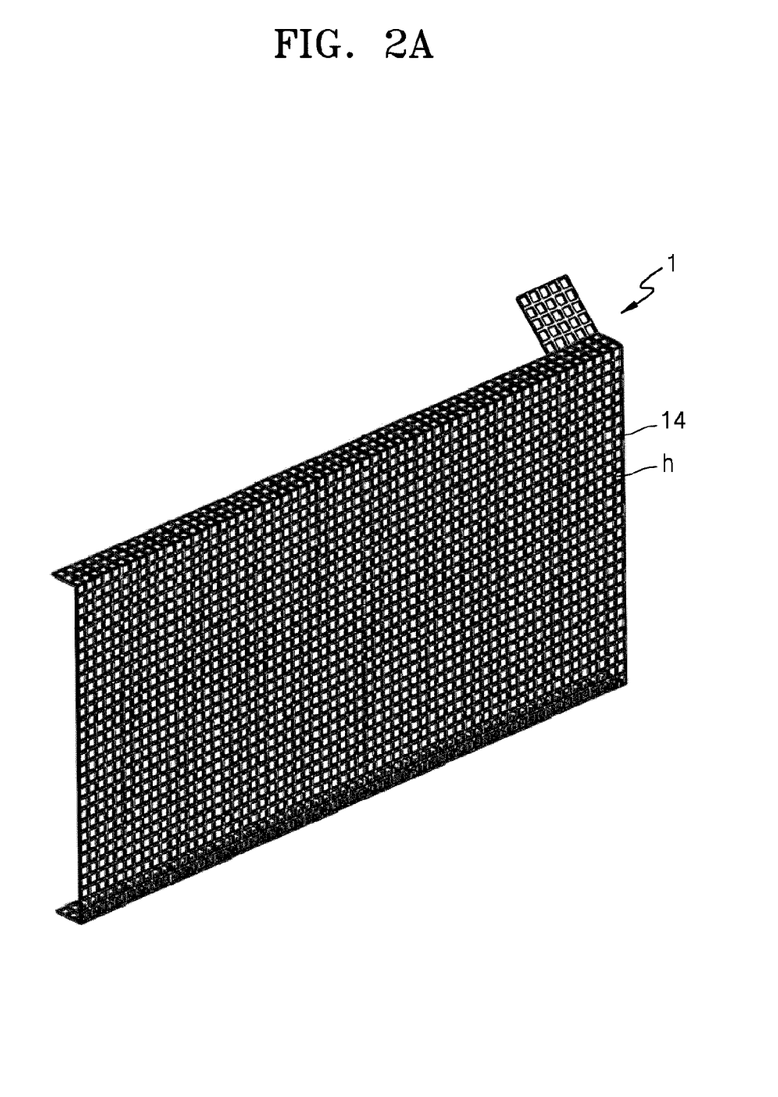
FIG. 2A is a schematic perspective view illustrating the cathode current collector illustrated in the FIGS. 1A to 1C.

FIG. 2A is a schematic perspective view illustrating the cathode current collector 14 illustrated in FIGS. 1A to 1C, and FIG. 2B is a partially-enlarged perspective view illustrating the cathode current collector 14 of FIG. 2A included in the metal air battery 1.

Figure 2B:
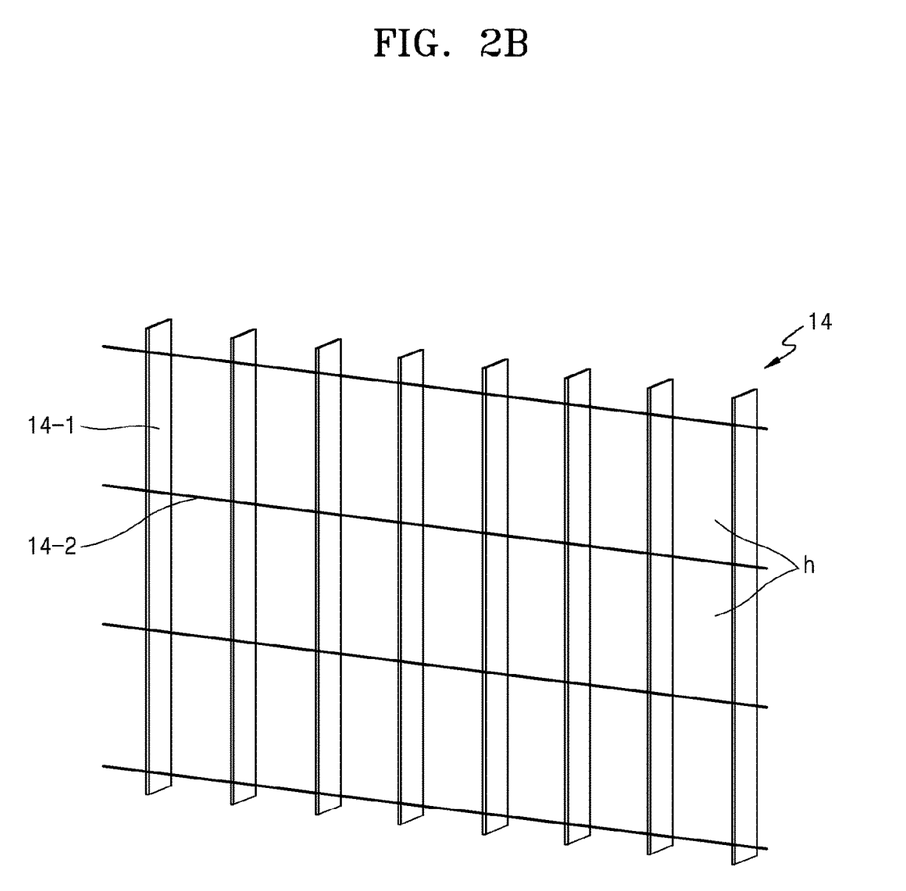
FIG. 2B is a partially-enlarged perspective view illustrating the cathode current collector of FIG. 2A.

Referring to FIGS. 2A and 2B, the cathode current collector 14 includes at least one blade 14-1 in contact with the GDL 100.

In the cathode current collector 14, the blade 14-1 is disposed to be at least partially embedded in the GDL 100. In this regard, the full length or nearly the full length of the blade 14-1 may be embedded in the GDL 100, the blade 14-1 thereby being surrounded by the GDL 100. In addition, when two or more blades 14-1 are present, there are gaps between the blades 14-1. The gaps between the blades 14-1 may prevent the cathode current collector 14 from impeding the flow of air flowing towards the GDL 100. In addition, the number of blades 14-1 may be increased, so long as an area for the contact between the blades 14-1 and the GDL 100 is sufficiently maintained. Thus, compared to an embodiment in which only one surface of a cathode current collector is attached to a side surface of a GDL, the area of contact between the blades 14-1 and the GDL 100 may be increased and the contact inhibition between the GDL 100 and the air may be reduced. Thus, the cathode current collector 14 including the blades 14-1 may provide an improved current collection effect, and accordingly, the metal air battery 1 equipped with the cathode current collector 14 may also advantageously provide improved specific capacity and improved energy density.

Any suitable blade having a form capable of burrowing into the GDL 100 may be used as the blade 14-1.

Referring to FIG. 1D and FIGS. 2A and 2B, when the width of the GDL 100 is greater than that the width W of the metal anode layer 11, the cathode current collector 14 may have a network structure including a plurality of rod-shaped supports 14-2 and a plurality of blades 14-1 arranged to intersect the plurality of rod-shaped supports 14-2. The cathode current collector 14 includes the plurality of the blades 14-1 arranged to be at least partially embedded in the GDL 100, and each of the blades 14-1 are embedded in the GDL 100 in a direction transverse to a longitudinal direction (L direction in FIG. 1D) of the GDL 100. For example, in the cathode current collector 14, each of the plurality of the blades 14-1 is arranged to be at least partially embedded in the GDL 100 in a direction perpendicular to the longitudinal direction L of the GDL 100.

Referring to FIGS. 1A to 1C, embodiments showing how the cathode current collector 14 is included in the metal air battery 1 are illustrated in detail. In particular, as illustrated in FIG. 1C, after the metal air battery 1 is equipped with the cathode current collector 14, the cathode current collector 14 may no longer be visible from the outside of the metal air battery since it is embedded in the GDL 100.

In addition, as illustrated in FIGS. 2A and 2B, the cathode current collector 14 may include a plurality of holes h.

The plurality of holes h included in the cathode current collector 14 may serve as a gas flow path. The cathode current collector 14 may include a plurality of holes h having a volume ratio of at least about 50%, at least about 55%, at least about 60%, at least about 70%, at least about 75%, or at least about 80%, or about 50% to about 99%, or about 60% to about 95%, based on a total volume of the cathode collector. The volume ratio of the plurality of holes h is a ratio of the total volume of the plurality of the holes h to a total volume of the cathode current collector 14. As the volume ratio of the plurality of the holes h increases, the supply of air via the cathode current collector 14 may increase, and the weight of the cathode current collector 14 may be reduced.

The plurality of the blades 14-1 may be spaced apart from each other at intervals greater than 0 millimeters (mm) and less than about 20 mm, or about 1 mm to about 18 mm.

Each of the plurality of the blades 14-1 may have a thickness that gradually decreases from an outer surface of the GDL 100 toward an inside of the metal air battery. Accordingly, when the metal air battery 1 comprises the cathode current collector 14, the plurality of the blades 14-1 may be easily burrowed into the GDL 100.

When each of the plurality of the blades 14-1 has a thickness that gradually decreases from an outer surface of the GDL 100 toward an inside of the metal air battery, a ratio of a smallest thickness to a greatest thickness of each of the plurality of the blades 14-1 may be in a range of about 0.1:1 to about 0.5:1, or about 0.15:1 to about 0.45:1, or about 0.2:1 to about 0.4:1.

The plurality of the blades 14-1 may include at least one of stainless steel, copper, stainless steel plated with gold to a thickness of 10 μm or less, and copper plated with gold to a thickness of 10 μm or less.

The plurality of the supports 14-2 may be spaced apart from each other at intervals of greater than 0 mm and less than about 20 mm, or about 1 mm to about 18 mm.

The support 14-2 may comprise the same material as that used for forming the blade 14-1.

Figure 3A:
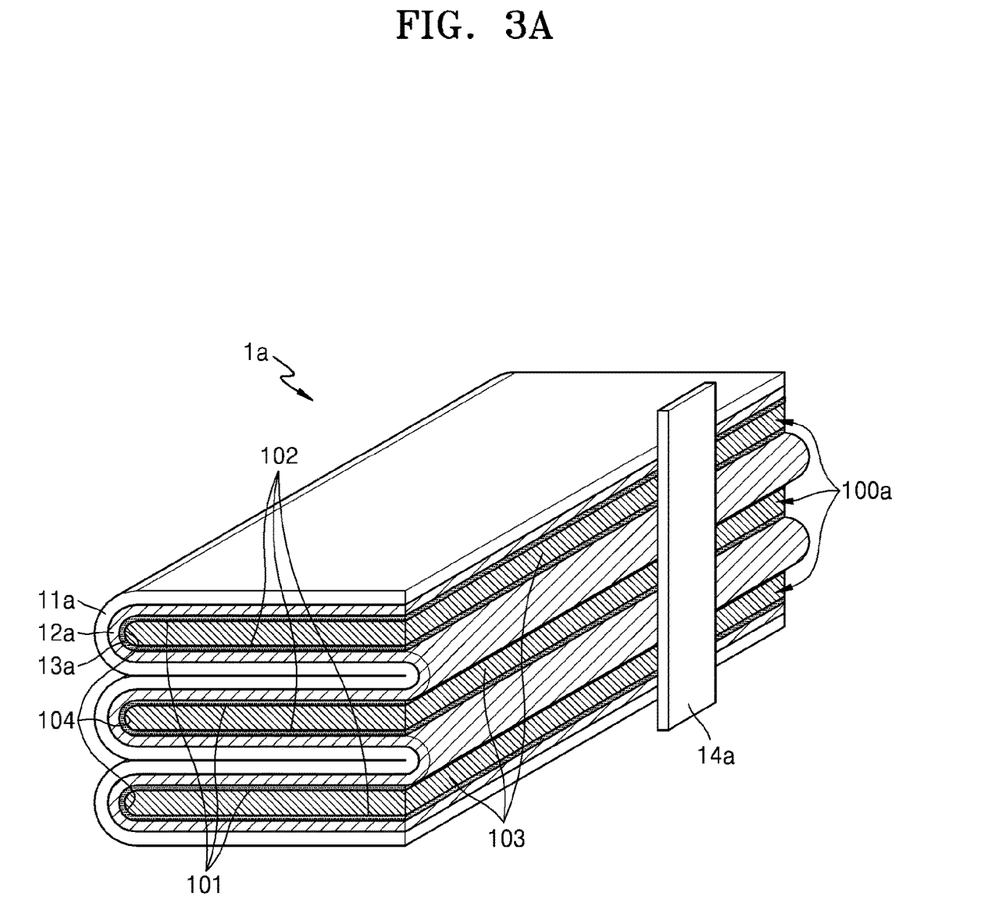
FIG. 3A is a schematic view illustrating a metal air battery including a cathode current collector, according to another exemplary embodiment.
Figure 3B:
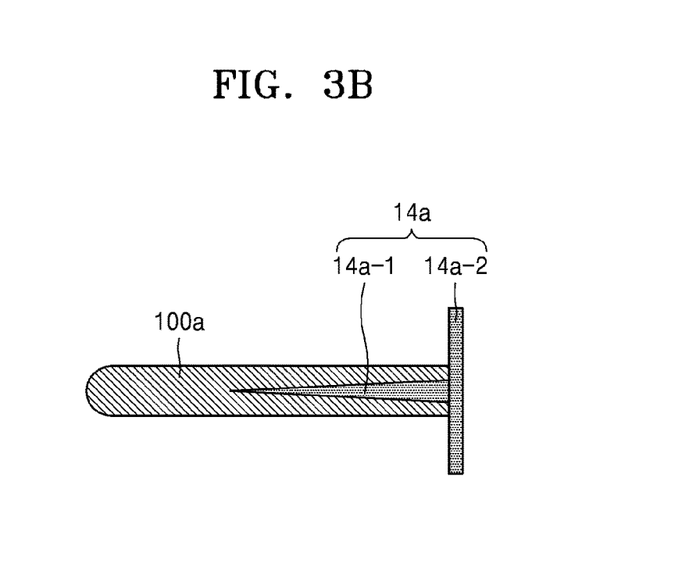
FIGS. 3B and 3D are each a side view illustrating a portion of a gas diffusion layer and a cathode current collector of the metal air battery of FIG. 3A.
Figure 3C:
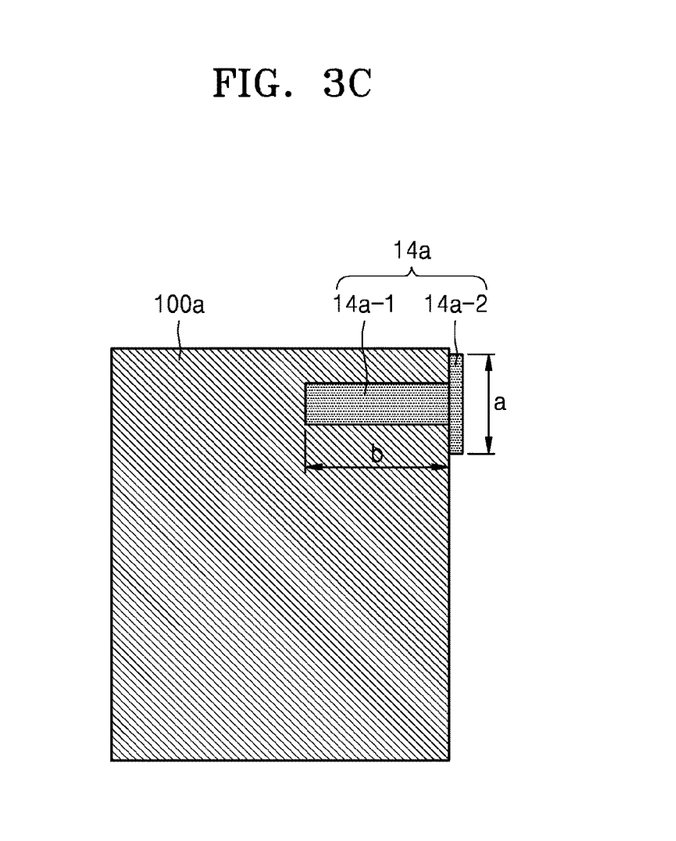
FIGS. 3C and 3E are each a plan view illustrating the gas diffusion layer and the cathode current collector of the metal air battery of FIG. 3A.
Figure 3D:
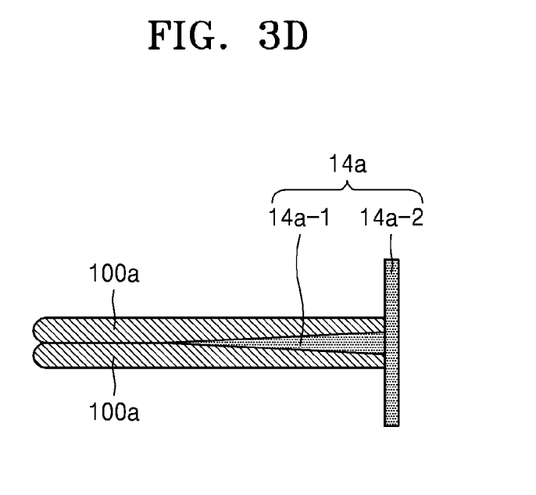
Figure 3E:
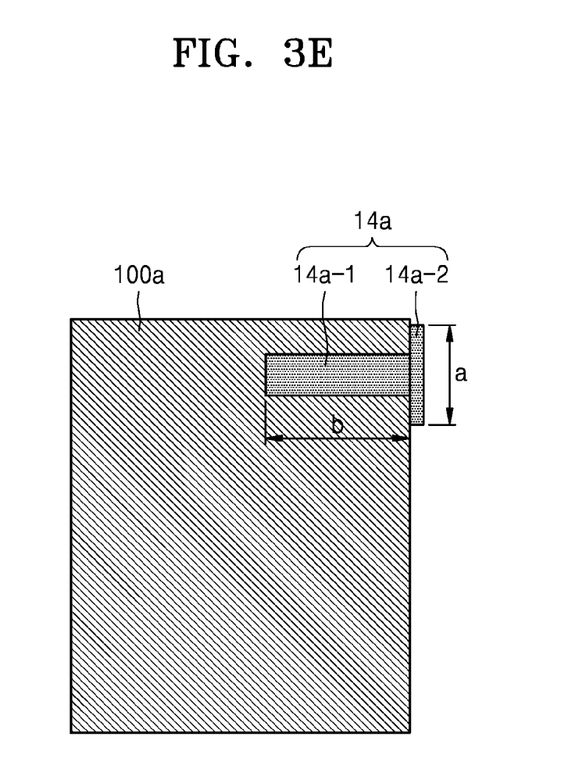

FIG. 3A is a schematic perspective view illustrating a metal air battery 1a including a cathode current collector 14a, according to another exemplary embodiment. FIGS. 3B and 3D are each a side view illustrating a portion of a GDL 100a and the cathode current collector 14a of the metal air battery 1a of FIG. 3A, and FIGS. 3C and 3E are each a plan view illustrating the GDL 100a and the cathode current collector 14a of the metal air battery 1a of FIG. 3A.

The metal air battery 1a includes the GDL 100a, a cathode layer 13a, an electrolyte membrane 12a, a metal anode layer 11a, and a cathode current collector 14a.

The metal air battery 1a of FIG. 3A is different from the metal air battery 1 illustrated in FIGS. 1A to 1D in that size of the GDL 100a included in the metal air battery 1a of FIG. 3A and the structure of the cathode current collector 14a of FIG. 3A are different from the size of the GDL 100 included in the metal air battery 1 of FIGS. 1A to 1D and the structure of the cathode current collector 14 of FIGS. 1A to 1D, respectively.

The cathode current collector 14a included in the metal air battery 1a of FIG. 3A may comprise the same material as that used to form the cathode current collector 14 included in the metal air battery 1 of FIGS. 1A to 1D.

The GDL 100a, the cathode layer 13a, the electrolyte membrane 12a, and the metal anode layer 11a included in the metal air battery 1a of FIG. 3A may have the same functions, materials, structures, and/or preparation methods as those described for the GDL 100, the cathode layer 13, the electrolyte membrane 12, and the metal anode layer 11d included in the metal air battery 1 of FIGS. 1A to 1D, respectively, and thus further detailed description thereof will be omitted.

In the metal air battery 1a of FIG. 3A, the GDL 100a may have a width equal to the width W of the metal anode layer 11a.

In addition, in the metal air battery 1a of FIGS. 3A and 3B, the cathode current collector 14a may have a structure including a plate-shaped support 14a-2 and at least one blade 14a-1 disposed on one surface of the plate-shaped support 14a-2. As illustrated in the drawings, the plate-shaped support 14a-2 may have a plate shape, but is not limited thereto, and a support having a different shape may also be used.

The cathode current collector 14a may be arranged such that the at least one blade 14a-1 is at least partially embedded in the GDL 100a in a direction parallel to a longitudinal direction of the GDL 100a. The longitudinal direction of the GDL 100a may be the same as a longitudinal direction L of the metal anode layer 11a.

As illustrated in FIG. 3B, the cathode current collector 14a may be arranged such that the blade 14-1 is at least partially embedded in the body of GDL 100a. In addition, as illustrated in FIG. 3B, a thickness of the blade 14a-1 gradually decreases from an outer surface of the GDL 100a toward s the inside of the metal air battery 1a, but is not limited thereto. For example, the blade 14a-1 may have a same thickness extending along the entire length thereof.

As illustrated in FIG. 3D, when two or more GDLs 100a and two or more blades 14a-1 are included in the cathode current collector 14a, the two or more blades 14a-1 may be disposed side by side on a single surface of the support 14a-2 and may be spaced apart from each other, and at least one of the two or more blades 14a-1 may be embedded in a gap between the at least two adjacent GDLs 100a.

Figure 4:
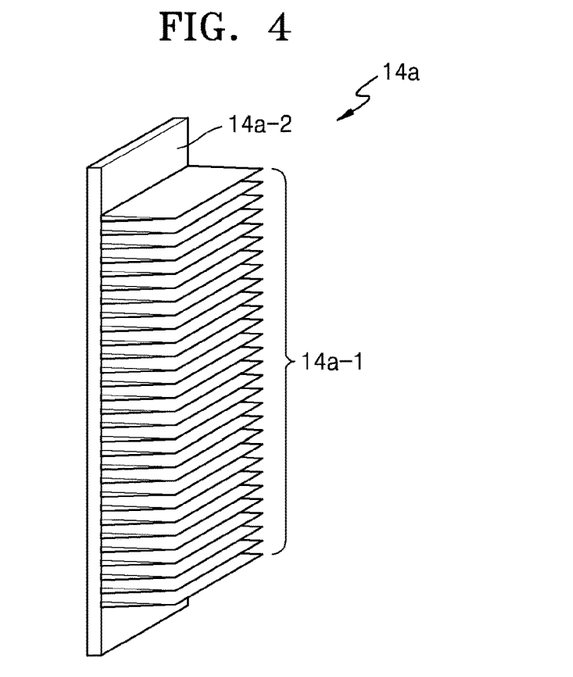
FIG. 4 is a schematic perspective view illustrating the cathode current collector illustrated in FIGS. 3A to 3E.

FIG. 4 is a schematic view illustrating the cathode current collector 14a of FIGS. 3A to 3E.

In the cathode current collector 14a of FIG. 4, a plurality of the blades 14a-1 may be spaced apart from each other at intervals greater than 0 mm and less than about 50 mm, about 1 mm to about 45 mm, or about 2 mm to about 40 mm.

In addition, in the cathode current collector 14a of FIGS. 3C, 3E and 4, a width a of the plate-shaped support 14a-2 may be equal to about 2% or less of a length of the GDL 100a of FIG. 3A, a length b of each of the plurality of the blades 14a-1 may be equal to about 50% or less of a width of the GDL 100a of FIG. 3A, and a greatest thickness of each of the plurality of the blades 14a-1 may be equal to about 75% or less of a thickness of GDL 100a of FIG. 3A (e.g., an average thickness of a portion of the GDL 100a in which the blade 14a-1 is embedded).

The metal air battery 1a of FIG. 3A may include two or more cathode current collectors 14a.

Figure 5:
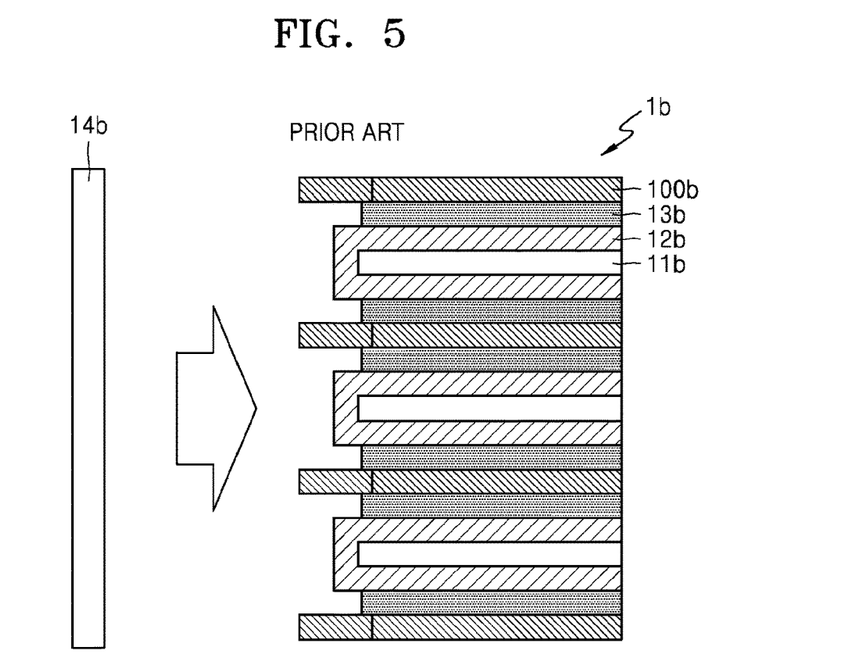
FIG. 5 is a schematic cross-sectional view illustrating a metal air battery which is not equipped with a cathode current collector.

FIG. 5 is a schematic cross-sectional view illustrating a metal air battery 1b in a state where the metal air battery 1b does not comprise a cathode current collector 14b.

The metal air battery 1b includes a GDL 100b, a cathode layer 13b, an electrolyte membrane 12b, a metal anode layer 11b, and a cathode current collector 14b.

The metal air battery 1b of FIG. 5 is different from the metal air battery 1 of FIGS. 1A to 1D in that structure of the cathode current collector 14b included in the metal air battery 1b of FIG. 5 is different from the structure of the cathode current collector 14 included in the metal air battery 1 of FIGS. 1A to 1D. In further detail, the cathode current collector 14b included in the metal air battery 1b of FIG. 5 has a plate-shaped or network structure that includes a plurality of pores, and does not include a blade.

The cathode current collector 14b included in the metal air battery 1b of FIG. 5 may comprise the same material as that used for forming the cathode current collector 14 included in the metal air battery 1 of FIGS. 1A to 1D.

The GDL 100b, the cathode layer 13b, the electrolyte membrane 12b, and the metal anode layer 11b included in the metal air battery 1b of FIG. 5 may have the same function, comprise the same material, have the same structure, and/or have the same preparation method as those of the GDL 100, the cathode layer 13, the electrolyte membrane 12, and the metal anode layer 11d included in the metal air battery 1 of FIGS. 1A to 1D, respectively.

In the metal air battery 1b of FIG. 5, the cathode current collector 14b contacts only an outer surface of the GDL 100, and thus the contact area between the cathode current collector 14b and the GDL 100b is so small that the current collection effect of the cathode current collector 14b may not be sufficient. Accordingly, the metal air battery 1b has a low volume specific capacity and a low energy density.

According to an embodiment, a metal air battery has an improved current collection effect in combination with a high volume specific capacity and a high energy density.

According to an embodiment, a cathode current collector for a metal air battery has improved contact area between the cathode current collector and a gas diffusion layer having a small external exposure area and has reduced contact inhibition between the gas diffusion layer and the air.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made herein without departing from the spirit and scope as defined by the following claims.

What is claimed is:
1. A metal air battery comprising:
   at least one gas diffusion layer comprising a first surface and a second surface facing the first surface;
   at least one cathode layer disposed on the first surface and on the second surface of the gas diffusion layer and configured to use oxygen as an active material;
   an electrolyte membrane disposed on the cathode layer;
   a metal anode layer disposed on the electrolyte membrane; and
   a cathode current collector comprising at least one blade,
   wherein the gas diffusion layer is electrically conductive, and wherein the at least one blade of the cathode current collector contacts and is at least partially embedded in the gas diffusion layer.

2. The metal air battery of claim 1, wherein a width of the gas diffusion layer is greater than a width of the metal anode layer.

3. The metal air battery of claim 2, wherein the cathode current collector comprises two or more blades spaced apart from each other at an interval of greater than 0 millimeters to less than about 20 millimeters.

4. The metal air battery of claim 1, wherein the cathode current collector has a network structure comprising a plurality of rod-shaped supports and a plurality of blades which intersect the plurality of rod-shaped supports.

5. The metal air battery of claim 1, wherein the at least one blade of the cathode current collector is at least partially embedded in the gas diffusion layer in a direction transverse to a longitudinal direction of the gas diffusion layer.

6. The metal air battery of claim 1, wherein a width of the gas diffusion layer is equal to a width of the metal anode layer.

7. The metal air battery of claim 6, wherein the cathode current collector is disposed such that the at least one blade is at least partially embedded in a body of the gas diffusion layer.

8. The metal air battery of claim 6, wherein the metal air battery comprises at least two adjacent gas diffusion layers and at least two blades, and
wherein the at least two blades are disposed side by side on a surface of the support and are spaced apart from each other, and at least one of the two or more blades is embedded in a gap between the at least two adjacent gas diffusion layers.

9. The metal air battery of claim 8, wherein the at least two blades are spaced apart from each other at an interval of greater 0 millimeters to less than 50 millimeters.

10. The metal air battery of claim 6, wherein
a width of the plate-shaped support is equal to about 2% or less of a length of the gas diffusion layer,
a length of the blade is equal to about 50% or less of the width of the gas diffusion layer, and
a greatest thickness of the blade is equal to about 75% or less of a thickness of the gas diffusion layer.

11. The metal air battery of claim 1, wherein the cathode current collector comprises a plate-shaped support and the at least one blade is disposed on a surface of the plate-shaped support, and
wherein the at least one blade is at least partially embedded in the gas diffusion layer in a direction parallel to a longitudinal direction of the gas diffusion layer.

12. The metal air battery of claim 1, wherein the cathode layer comprises a bend and surrounds the first surface, the second surface, and a first side surface of the gas diffusion layer.

13. The metal air battery of claim 1, wherein a thickness of the at least one blade decreases from an outer surface of the gas diffusion layer toward an inside of the metal air battery.

14. The metal air battery of claim 13, wherein a ratio of a smallest thickness to a greatest thickness of the at least one blade is in a range of about 0.1:1 to about 0.5:1.

15. The metal air battery of claim 1, wherein the at least one blade comprises at least one of stainless steel, copper, stainless steel plated with gold to a thickness of 10 micrometers or less, and copper plated with gold to a thickness of 10 micrometers or less.

16. A cathode current collector for a metal air battery, the cathode current collector comprising a network structure comprising a plurality of rod-shaped supports and a plurality of blades which intersect the plurality of rod-shaped supports.

17. The cathode current collector of claim 16, wherein the network structure comprises a plurality of holes, and
wherein a ratio of a total volume of the plurality of the holes to a total volume of the cathode current collector is at least about 50%.

18. A method of preparing a metal air battery, comprising:
disposing at least one cathode layer on a first surface and on a second surface of at least one gas diffusion layer;
disposing an electrolyte membrane on the cathode layer;
disposing a metal anode layer on the electrolyte membrane;
providing a cathode current collector comprising at least one blade; and
at least partially embedding the at least one blade in the gas diffusion layer to prepare the metal air battery, wherein the cathode current collector contacts the gas diffusion layer.

* * * * *